Sept. 16, 1969  E. N. BURCH  3,467,048
COMBINATION SLED AND BOAT
Filed May 26, 1967  4 Sheets-Sheet 1
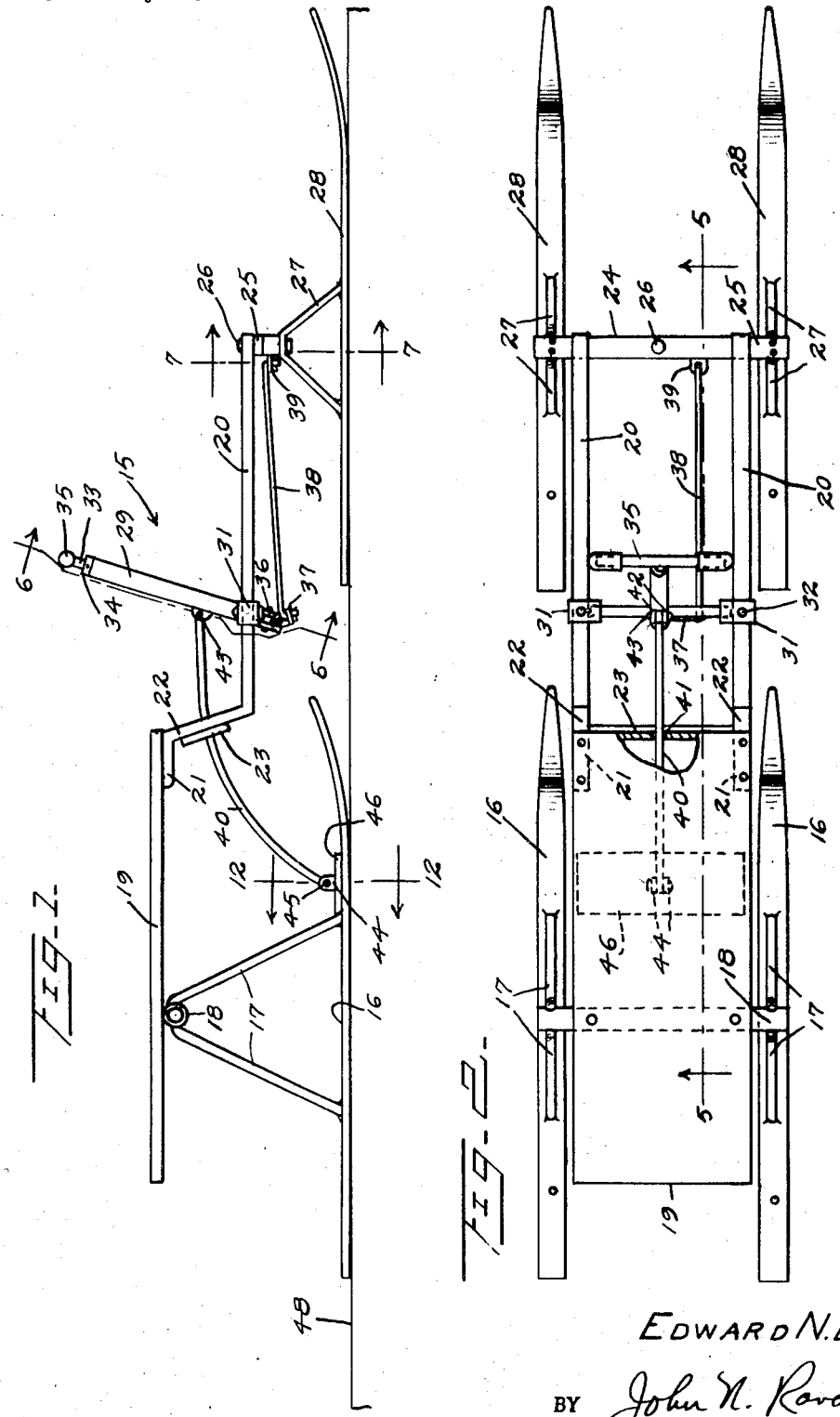
INVENTOR
EDWARD N. BURCH
BY John N. Randolph
ATTORNEY Sept. 16, 1969  E. N. BURCH  3,467,048
COMBINATION SLED AND BOAT
Filed May 26, 1967  4 Sheets-Sheet 2
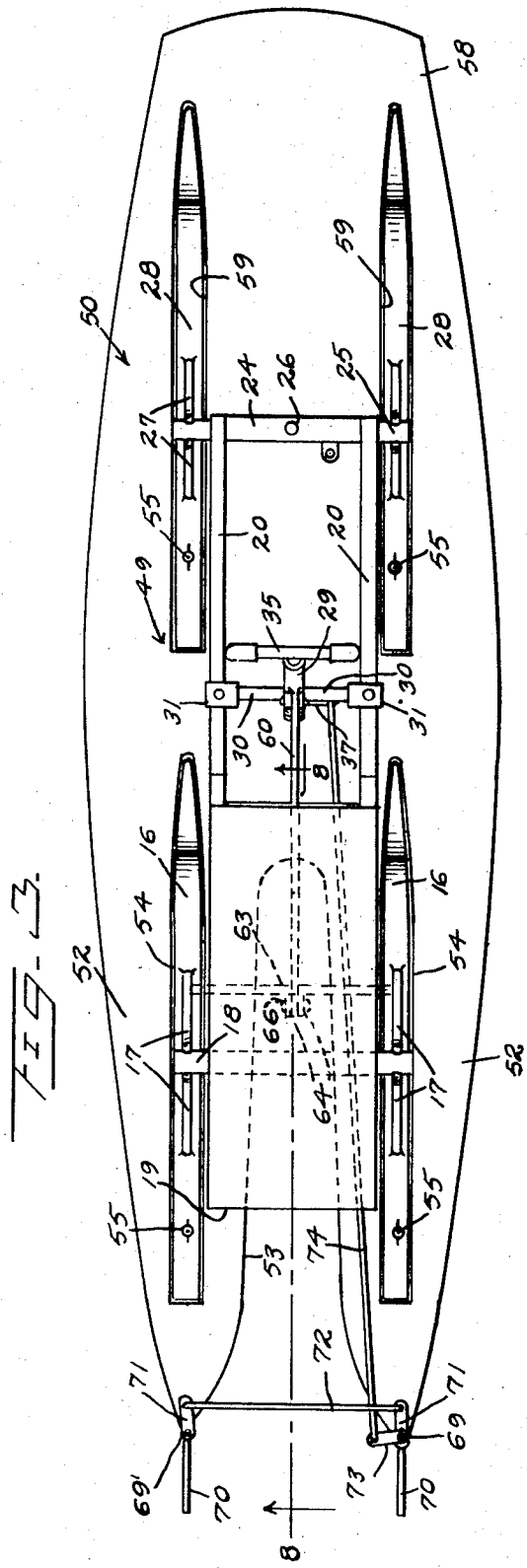
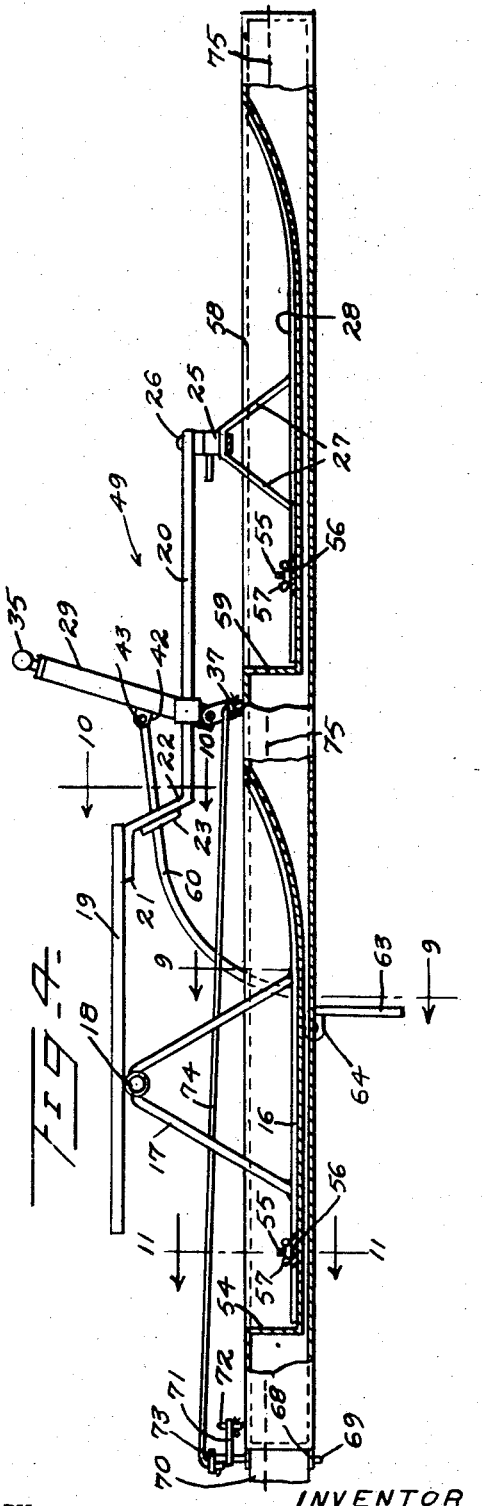
INVENTOR
EDWARD N. BURCH
BY John N. Randolph
ATTORNEY

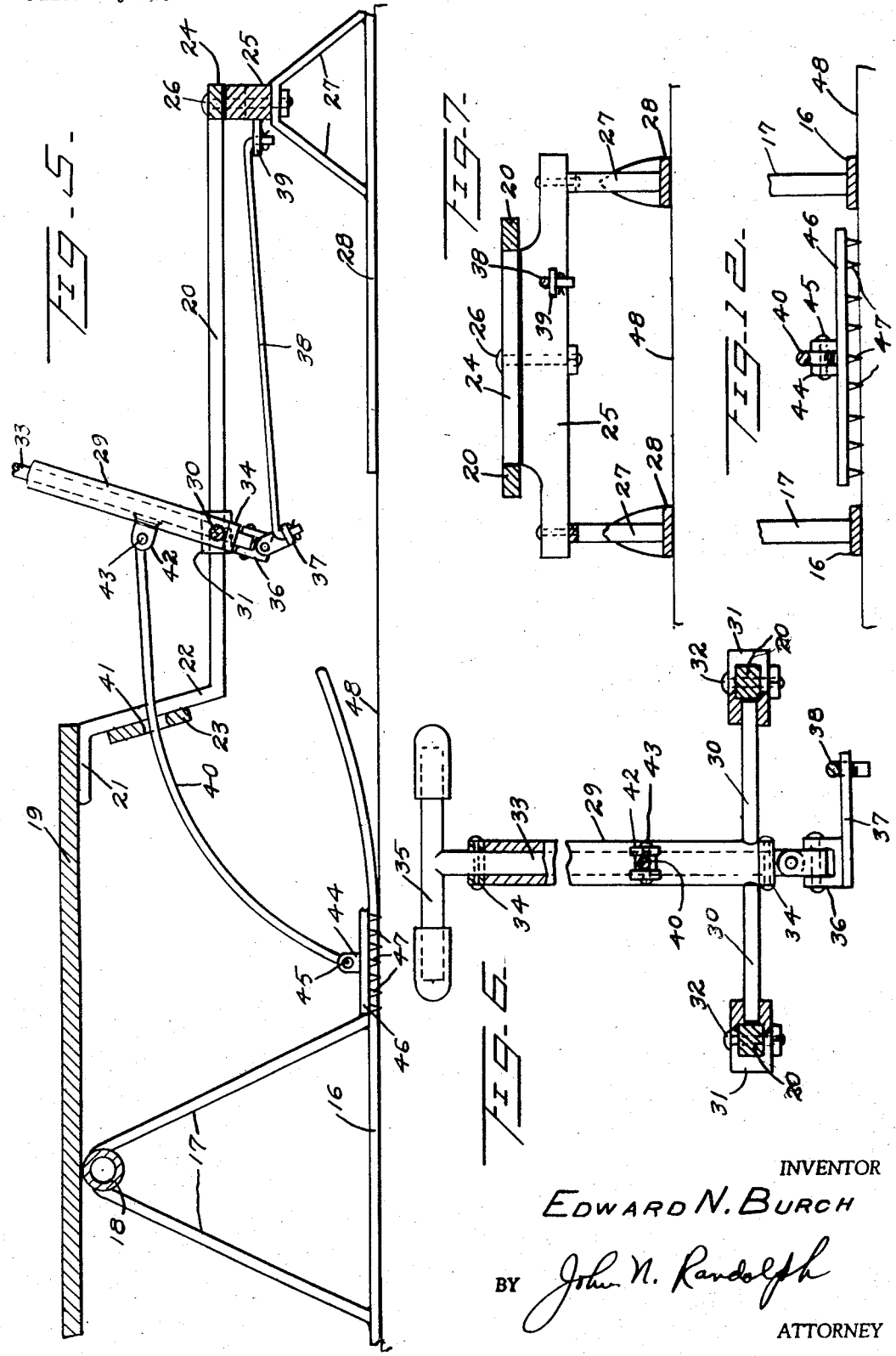

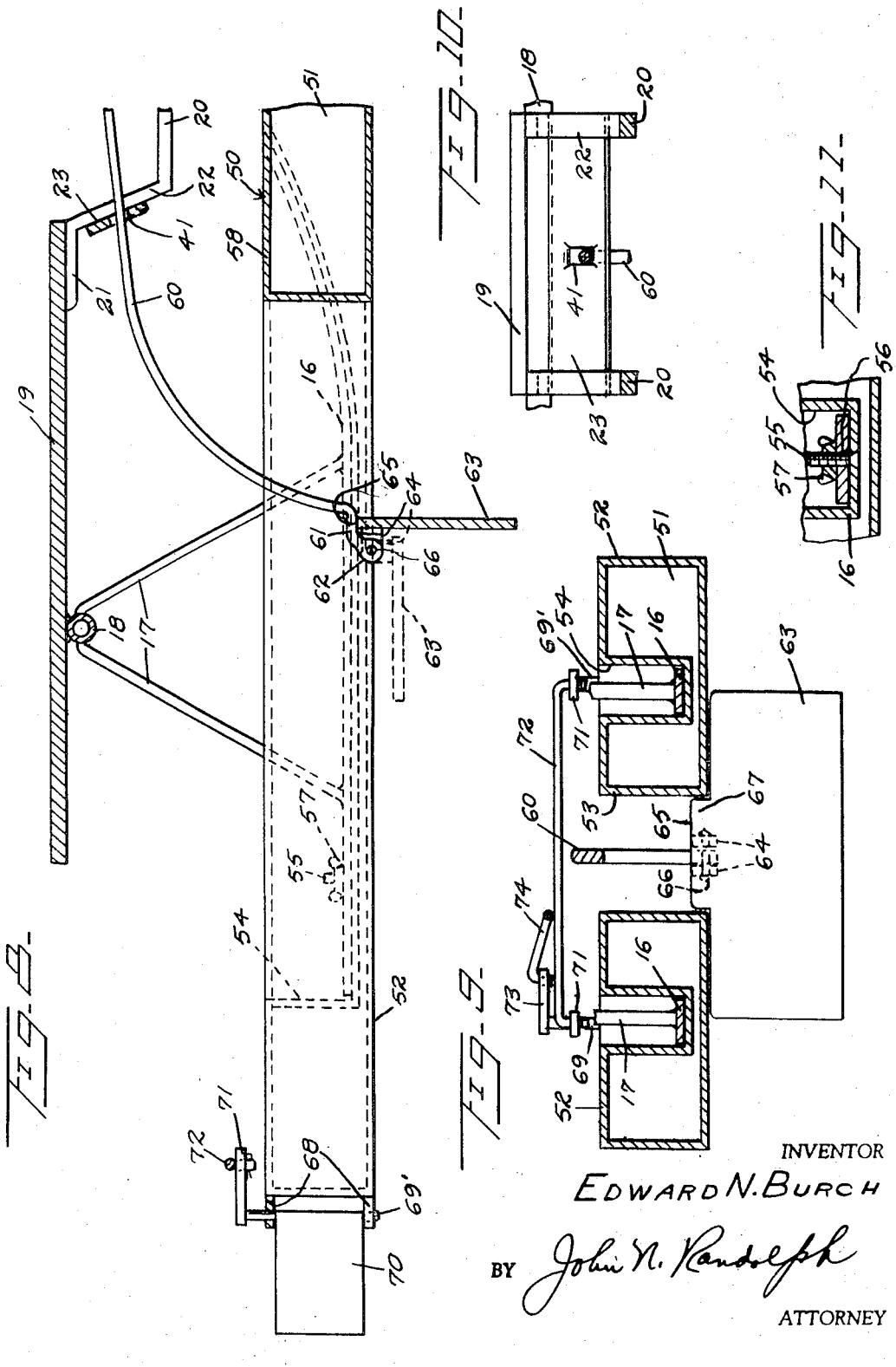

United States Patent Office 3,467,048
Patented Sept. 16, 1969

3,467,048
COMBINATION SLED AND BOAT
Edward N. Burch, 6261 Swartout Road,
Algonac, Mich. 48001
Filed May 26, 1967, Ser. No. 641,632
Int. Cl. B63b 35/34; B62b 15/00
U.S. Cl. 115—21         3 Claims

ABSTRACT OF THE DISCLOSURE

A vehicle propelled and steered by the occupant, capable of use on ice, snow or water, and having a handle for oscillating movement and connected to a propulsion member which is reciprocated thereby and which, when urged rearwardly, by contact with the element on which the vehicle is traveling, propels the vehicle in a forward direction, said handle additionally forming a part of a steering mechanism of the vehicle.

BACKGROUND OF THE INVENTION

This invention relates to a land vehicle capable of use either on snow or ice or on water.

The prior art discloses toy vehicles intended for use on either snow, ice or on water, as well as sleds only intended for use on ice and snow and which sleds are capable of being propelled and steered by the occupant.

SUMMARY

It is a primary object of the present invention to provide a vehicle capable of being propelled and steered by the occupant and which may be readily converted from a sled for use on snow or ice to a boat for use on water.

Another object of the invention is to provide a vehicle having novel manual propelling and manual steering means, and which is readily convertible for use thereof with the vehicle either as a sled or boat.

Various other objects and advantages of the invention will hereinafter become more fully apparent from the following description of the drawings, illustrating a presently preferred embodiment thereof, and wherein:

BRIEF DESCRIPTION OF THE DRAWINGS

FIGURE 1 is a side elevational view of the invention assembled for use as a sled;

FIGURE 2 is a top plan view thereof;

FIGURE 3 is a top plan view, on a reduced scale, of the vehicle converted for use as a boat;

FIGURE 4 is a side elevational view thereof, partly in longitudinal section;

FIGURE 5 is an enlarged fragmentary longitudinal sectional view, taken substantially along a plane as indicated by the line 5—5 of FIGURE 2;

FIGURE 6 is an enlarged fragmentary cross sectional view, partly in elevation, taken substantially along the line 6—6 of FIGURE 1;

FIGURE 7 is an enlarged cross sectional view taken substantially along the line 7—7 of FIGURE 1;

FIGURE 8 is an enlarged fragmentary longitudinal sectional view taken substantially along the line 8—8 of FIGURE 3;

FIGURE 9 is an enlarged fragmentary cross sectional view taken substantially along the line 9—9 of FIGURE 4;

FIGURE 10 is an enlarged fragmentary cross sectional view taken substantially along a plane as indicated by the line 10—10 of FIGURE 4;

FIGURE 11 is an enlarged fragmentary vertical sectional view taken substantially along a plane as indicated by the line 11—11 of FIGURE 4, and FIGURE 12 is a fragmentary transverse sectional view taken substantially along the line 12—12 of FIGURE 1.

DESCRIPTION OF THE PREFERRED EMBODIMENT

Referring more specifically to the drawings, and first to reference to FIGURES 1, 2, 5 to 7, and 12, the vehicle 15 as disclosed therein constitutes a sled adapted for use on ice or snow and includes a pair of transversely spaced rear runners 16. A pair of struts 17 extend upwardly from each runner 16 to support a cross frame member 18 on which is secured a seat member 19. Said seat member is disposed above and longitudinally of the runners 16. Two transversely spaced frame members or bars 20 have upwardly offset rear ends 21 which are secured to the underside of the forward portion of the seat 19. Said bars 20 have downwardly and forwardly inclined portions 22 extending from said rear portions 21. A cross member 23 is secured to and extends between said bar portions 22. A rigid cross piece 24 extends between and is secured to the forward ends of the bars 20. A bolster 25, as best seen in FIGURE 7, is disposed beneath and supports the cross piece 24. A king bolt 26 extends through the cross piece 24 and bolster 25 for connecting said parts intermediate of their ends and to permit the bolster to turn relative to the cross piece about a vertical axis as defined by the king bolt. Struts 27 are fixed to and extend downwardly from the bolster 25, adjacent to the ends thereof, and rest upon and are secured to a pair of transversely spaced front runners 28.

A rigid tube or sleeve 29 has trunnions 30 adjacent to the lower end thereof which are journaled in socket members 31. The socket members 31 are secured to the bars 20, as by fastenings 32, forwardly of and adjacent to the bar portions 22 and in transverse alignment with one another. A rod 33 extends through and fits turnably in the sleeve 29 and carries collars 34 which abut the ends of said sleeve to prevent sliding movement of the rod therein. The rod 33 has a cross member at its upper end forming a handle 35.

A universal joint 36 is connected to the lower end of the rod 33 and a steering arm or lever 37 extends laterally from the lower section of the joint 36. A link 38 has one end pivotally connected to the outer end of the arm 37 and an opposite end which is pivotally connected to an ear 39 which extends rearwardly from the bolster 25 and which is laterally offset from the king bolt 26, as seen in FIGURES 2 and 7.

A rod 40 extends slidably through an opening 41 of the cross member 23 and has a forward end disposed between a pair of ears 42 which extend rearwardly from the sleeve 29 and which are disposed above and spaced from the trunnions 30. The rod 40 is pivotally connected by a fastening 43 to the ears 42 and thus to the sleeve 29, and has a downwardly curved rear portion, as best seen in FIGURE 5, the terminal of which fits between a pair of ears 44 and is pivotally connected thereto by a fastening 45. The ears 44 are fixed to and rise from the central portion of a rigid plate 46 which have teeth or projections 47 on the underside thereof. The pivots 43 and 45 are disposed crosswise of the vehicle 16. The sleeve 29 and its associated parts combine with the rod 40 and a plate 46 to form the propulsion unit of the sled 16 and said sleeve 29, rod 33 and the parts 25, 26, 37, 38 and 39 combine to form the steering mechanism of the sled.

The occupant of the sled 15, while sitting on the seat 19, with his feet engaging the sockets 31, oscillates the sleeve 29 forwardly and rearwardly or right and left, as seen in FIGURES 1 and 5, by grasping the handle 35.

Assuming that the sled is operating on ice, as indicated at 48, as the sleeve 29 is swung forwardly or to the right from its position of FIGURES 1 and 5, the rod 40 will be pulled forwardly through the opening 41 and the rear portion thereof will be raised as the rod moves forwardly, due to its downward curvature, for elevating the plate 46 to disengage the projections 47 thereof from the ice surface 48. As the sleeve 29 is thereafter swung rearwardly or to the left of FIGURES 1 and 5, the rod 40 will move rearwardly and downwardly to cause the projections to again contact the ice surface 48, somewhat before the sleeve 29 has reached its position of FIGURES 1 and 5. Thereafter the projections 47 by penetrating the surface 48 will be held against movement with respect thereto, so that as the sleeve 29 continues its rearward swinging movement for forcing the rod 40 rearwardly of the sled, the sled will be propelled forwardly or from left to right of FIGURES 1 and 5, with the runners 16 and 28 sliding on the surface 48. As the sleeve 29 is again swung forwardly, the projections will be disengaged from the surface 48 and the plate 46 will again be elevated so that the aforedescribed operation can be repeated.

While the sled 15 is thus being propelled in a forward direction, the handle 35 can be turned in either direction for turning the rod 33 in the sleeve 29 to cause the arm 37 to be swung either forwardly or rearwardly for exerting a thrust or pull on the link 38 and ear 39 for turning the bolster 25 and the front runners 28 to either the left or right, for steering the sled during its forward travel. The universal joint 36 permits rocking movement of the arm 37 relative to the rod 33 so that the arm 37 and the lower section of the universal joint 36 may swing relative to the rod 33 to prevent a pull or thrust being exerted on the link 38 by the oscillating movement of the rod 33 and sleeve 29.

FIGURES 3, 4 and 8 to 11 illustrate the sled 15 converted into a boat 49. All of the parts heretofore described are utilized except the plate 46 and the ear 39. The link 38 is replaced by a longer link and the rod 40 is replaced by a somewhat differently shaped rod. The remaining parts bear the same reference numerals as in FIGURES 1, 2, 5 to 7 and 12.

The boat 49 additionally includes an elongated pontoon 50 which may be formed of a light weight metal or plastic, which is hollow and defines a sealed chamber 51; or the pontoon may be made solid and be formed of wood. The pontoon 50 has a bifurcated stern portion formed by corresponding furcations 52 which are spaced apart to provide a long opening 53. The furcations 52 have corresponding longitudinally extending wells or depressions 54 of a proper size and shape to receive the two rear runners 16, as best seen in FIGURES 4 and 9. A threaded stud 55 projects upwardly from the bed of each well 54 through an opening 56 in the runner 16 which is contained in said well, and a wing nut 57 engages each stud 55 and bears on the runner 16, for detachably achoring the runners in the wells 54 and to the pontoon 50, as best seen in FIGURE 11. The forward portion of the top surface or deck 58 of the pontoon 50 is likewise provided with two transversely spaced longitudinally extending wells 59 of a proper size and shape to accommodate the front runners 28 which are secured therein in the same manner by studs 55 which extend through openings 56 of said runners and which are engaged by wing nuts 57. It will thus be seen that the front and rear runners are detachably secured immovably in the wells of the pontoon 50 with the seat 19 and frame members 20 disposed above and spaced from the pontoon deck 58, as best seen in FIGURES 4 and 8.

A rod 60, which replaces the rod 40, extends slidably through the opening 41 of the cross member 23 and is pivotally connected at its forward end by the fastening 43 to the sleeve 29. The rod 60 is similar in shape to the rod 40, except that the rear portion thereof is curved downwardly to a greater extent and is provided with a substantially horizontal abutment portion 61 which is disposed adjacent to its rear terminal 62, which extends downwardly from the portion 61. A plate 63, as best seen in FIGURES 8 and 9, has a pair of transversely spaced ears 64 which project from one side thereof and adjacent to an upper edge portion 65. The rod terminal 62 fits between the ears 64 and is pivotally connected thereto by a fastening 66. The plate or blade 63 is disposed beneath portions of the pontoon furcations 52 and crosswise thereof and includes a portion 67 which extends into the opening 53, to which the ears 64 are attached and which is provided with the edge portion 65.

Top and bottom vertically aligned journal members 68, as seen in FIGURE 8, extend rearwardly from each pontoon furcation 52. A shaft 69 is journaled in one pair of the members 68 and a shaft 69' is journaled in the other pair of members 68. Rudders 70 are fixed to the shafts 69 and 69' between the journals 68 thereof. The shafts 69 and 69' have lever arms 71 connected thereto and which extend forwardly from said shafts over rear portions of the pontoon furcations 52. A link 72 extends between and is pivotally connected to the lever arms 71 to cause the rudders 70 to swing in unison. The shaft 69 has a second lever arm 73 which is disposed above the level of the lever arms 71 and link 72 and which is disposed at approximately a right angle to the lever arms 71. The rear end of a long link 74 is pivotally connected to the lever arm 73, and the forward end of said link is pivotally connected to the arm 37, and replaces the link 38.

The pontoon boat 49 is propelled through the water 75 by an occupant seated upon the seat 19, facing forwardly and grasping the handle 35 with both hands. As the handle 35 is manipulated to swing the sleeve 29 forwardly or from left to right of FIGURE 4, the rod 60 will exert a forward pull on the blade 63. The pressure of the water 75, in which the pontoon 50 is partially submerged, will cause the blade 63 to swing upwardly about its pivot 66 to a substantially horizontal position, as illustrated in dotted lines in FIGURE 8, so that said blade will offer a minimum of resistance to the movement thereof through the water. The blade 63 is formed of a non-buoyant material so that when its forward movement ceases it will immediately commence to swing downwardly in a counterclockwise direction toward its full line position of FIGURE 8, so that when the sleeve 29 is thereafter swung rearwardly to exert a rearward thrust on the rod 60, the blade 63 will be disposed in a vertical position for pushing rearwardly against the water to propel the boat 49 forwardly or from left to right of FIGURES 3 and 4. The rod portion 61 is disposed to be engaged by the upper edge portion 65 in the vertical, operative position of the blade 63 to prevent said blade from swinging past a vertical position. It will be readily apparent that repeated oscillating movement of the sleeve 29 will cause the boat 49 to be propelled in a forward direction.

The occupant while thus propelling the boat may turn the handle 35 in either direction for causing the lever arm 37 to be swung either forwardly or rearwardly to exert either a pull or a thrust, respectively, on the link 74 to swing the arm 73 either forwardly or rearwardly for moving the rudders 70 either clockwise or counterclockwise, as seen in FIGURE 3, respectively, for turning the boat 49 either to the left or to the right, respectively. The universal joint 36 functions in the same manner as heretofore described to prevent a pull or thrust being transmitted to the link 74 by oscillating movement of the rod 33 and sleeve 29.

Various modifications and changes are contemplated and may obviously be resorted to, without departing from the function or scope of the invention.

I claim as my invention:

1. A boat comprising an elongated pontoon, a frame supported on the pontoon, a seat supported on the frame, a propulsion unit including a member supported for oscillating movement on the frame lengthwise of the pontoon and forwardly of the seat, a rod having a forward end pivotally connected to said member, a blade pivotally connected to the rear end of the rod and disposed beneath the pontoon and crosswise thereof for swinging movement relative to the rod between an inoperative substantially horizontal position assumed during forward travel thereof relative to the pontoon and a depending vertical and operative position assumed during rearward travel relative to the pontoon for propelling the boat in a forward direction, said pontoon having an opening through which the rod extends, guide means carried by the frame and slidably supporting an intermediate portion of the rod for supporting the blade for reciprocating movement beneath the pontoon and substantially parallel to the plane thereof, rudder means swingably connected to the pontoon, and a steering mechanism connecting the rudder means to said member and including a handle swivelly connected to said member and adapted to be manipulated for oscillating said member to propel the boat and for actuating the rudder means for steering the boat either selectively or simultaneously, said pontoon being capable of supporting the frame, seat and occupant afloat.

2. A boat as in claim 1, said steering mechanism including a universal joint to prevent actuation of the rudder means by the oscillating movement of said member.

3. A boat as in claim 1, said rod having a portion forming a stop engaged by a part of the blade to prevent swinging movement of the blade in one direction beyond a depending vertical position.

References Cited

UNITED STATES PATENTS

| | | | |
|---|---|---|---|
| 92,807 | 7/1869 | Farmer | 115—22 |
| 234,954 | 11/1880 | Burin | 115—22 |
| 1,281,642 | 10/1918 | O'Hanlon | 115—21 |
| 1,635,641 | 7/1927 | Seiter | 280—12.11 |
| 2,203,060 | 6/1940 | Ruffner | 280—12.11 |
| 2,528,304 | 10/1950 | Granger | 115—21 |
| 2,751,876 | 6/1956 | Ogilvie | 115—22 |
| 3,125,982 | 3/1964 | Mullenax | 9—310 XR |

FOREIGN PATENTS 907,508    3/1954    Germany.

MILTON BUCHLER, Primary Examiner

PAUL E. SAUBERER, Assistant Examiner

U.S. Cl. X.R.

115—32; 280—11.12